US008141206B2

(12) United States Patent
Chen et al.

(10) Patent No.: US 8,141,206 B2
(45) Date of Patent: Mar. 27, 2012

(54) TWO-STAGE TORSION PIVOT HINGE (75) Inventors: Chia-Hui Chen, Taoyuan (TW); Jih-Nan Tai, Taoyuan (TW); Chia-Ming Chang, Taoyuan (TW); Tzu-Yu Lin, Taoyuan (TW)

(73) Assignee: Lianhong Art Co., Ltd., Taoyuan (TW)

( * ) Notice: Subject to any disclaimer, the term of this patent is extended or adjusted under 35 U.S.C. 154(b) by 180 days.

(21) Appl. No.: 12/717,626

(22) Filed: Mar. 4, 2010

(65) Prior Publication Data

US 2010/0223756 A1 Sep. 9, 2010

(30) Foreign Application Priority Data

Mar. 6, 2009 (TW) ................................ 98203444 U (51) Int. Cl.
*E05C 17/64* (2006.01)

(52) U.S. Cl. ........ 16/342; 16/337; 361/679.27; 248/922

(58) Field of Classification Search .................... 16/342, 16/337, 374, 297, 303, 330; 455/575.3; 379/433.13; 361/679.27; 248/922
See application file for complete search history.

(56) References Cited

U.S. PATENT DOCUMENTS

| 5,896,622 | A  | * | 4/1999  | Lu ................................. 16/342 |
| 6,170,120 | B1 | * | 1/2001  | Lu ................................. 16/342 |
| 6,230,365 | B1 | * | 5/2001  | Lu ................................. 16/342 |
| 6,657,856 | B1 | * | 12/2003 | Lu ............................ 361/679.58 |
| 7,124,473 | B2 |   | 10/2006 | Lu et al. |
| 7,451,522 | B2 | * | 11/2008 | Lu et al. .......................... 16/342 |
| 7,451,523 | B2 | * | 11/2008 | Chen ............................... 16/342 |
| 7,607,202 | B1 | * | 10/2009 | Lee ................................. 16/342 |
| 8,006,347 | B2 | * | 8/2011  | Sue et al. ......................... 16/338 |
| 2009/0083943 | A1 | * | 4/2009 | Chen ............................... 16/342 |
| 2009/0106939 | A1 | * | 4/2009 | Chang ............................. 16/342 |

* cited by examiner

*Primary Examiner* — William L. Miller
(74) *Attorney, Agent, or Firm* — Guice Patents PLLC (57) ABSTRACT

A two-stage torsion pivot hinge including an axle connected with a base and having a shaft mounted thereon with a bush for a spring tube. The bush forms a first and a second protrusion element respectively extending out of its two ends. The spring tube is fixedly connected with a supporting member and is provided with two torsion sleeves respectively on the two ends of the bush. Each torsion sleeve has an axial cut and has two contact elements extending respectively toward the two ends of the bush. The contact elements respectively interfere with the first and the second protrusion elements. By the function between the torsion sleeve and the bush, the pivot hinge can provide different torsion forces for the stroke of rotating the screen from its closed position to a vertical angular position and for the stroke from the vertical position to its maximum opening angular position.

6 Claims, 13 Drawing Sheets

TWO-STAGE TORSION PIVOT HINGE

BACKGROUND OF THE INVENTION

1. Field of the Invention

The present invention relates to a two-stage type torsion pivot hinge, and especially to a pivot hinge mounted on a set of foldable electronic equipment to allow a screen to have a larger supporting force when it is opened and get its working angular position, while only a smaller force is needed for opening, but a larger force is needed for closing to prevent impact.

2. Description of the Prior Art

On a set of foldable electronic equipment such as a notebook, pivot hinges must be used to connect a screen to the main body of a key board, so that the screen can be rotated taking the pivot hinges as a center for opening or closing relative to the key board.

The torsion force provided for a common pivot hinge is constant when in opening at any angular position, that is, a user shall use the same force to rotate the screen, overly large torsion force will render uneasy of opening, while overly small torsion force will make the screen be subjected to falling down, and to resulting impact in closing.

Particularly, following evolving of computer operational systems, it is the probable coming tendency of development to directly install touch controlled displaying screen in a notebook for the convenience of use of a user. Therefore, for the purpose of meeting the coming tendency, it is necessary to innovate a two-stage type torsion pivot hinge, in order that there is a larger supporting force for a screen when it is at a position to be opened, so that a user is convenient to operate the touch controlled screen without having the screen being shaken or falling down.

In a preceding U.S. Pat. No. 7,124,473 titled "HINGE FOR A NOTEBOOK COMPUTER", a two-stage type torsion pivot hinge was provided. The case disclosed a pivot hinge to be mounted on a notebook and having a function of opening a screen in two stages, the pivot hinge includes a fixing seat fixed on the main body of the notebook, and is provided thereon with a passage and an barrel in communicating therewith, and a pintle in connecting with the screen of the notebook is provided in cooperation with the passage with shaft, the shaft is provided thereon in turn with a first tube, a sleeve and a second tube, the lower sides of the first and the second tubes are fixed in the barrel, while the upper sides of the first and the second tubes are mounted in the passage, the sleeve is provided in the passage and are kept suitable tightness against the shaft, the two lateral sides of the sleeve are provided with arc shaped protruding sheets, the front end of one side of the first tube is provided with a first stop, and the tailing end of one side of the second tube is provided with a second stop; when in use, the first stage opening of the screen goes to about 45 degrees, mean time the main body will not be lifted together, while the second stage opening of the screen goes to further suitable opening degree for the convenience of using by the user.

The preceding U.S. Utility Patent is provided only for the convenience of opening by a user, and only is provided with a sleeve between two tubes, such design is hard to meet the requirement for a larger supporting force for a touch screen, and has no design for limitation of the maximum opening degree; hence there is still necessity for improvement to meet the requirement of a touch screen.

SUMMARY OF THE INVENTION

Therefore, the present invention provides a brand new two-stage type torsion pivot hinge, to allow a foldable screen of a set of electric equipment to rotate for opening to about a vertical angular position relative to the main body of a keyboard, so that the pivot hinge can provide a larger rotational torsion force for the convenience of operation of a touch screen; however, when the screen is closed from the maximum opening angular position toward the main body, after it is moved over the approximately vertical angular position, the pivot hinge provides an increased rotational torsion force.

The two-stage type torsion pivot hinge of the present invention further has a function of limiting the maximum opening degree to prevent overly opening of the screen.

The two-stage type torsion pivot hinge of the present invention mainly comprises:

a base which is fixed in the main body of a keyboard;

an axle which has a connecting section in connecting with the base, and a shaft;

a spring tube having a bush tightly slipping over the shaft and having an extension plane plate; the bush forms an axial cut at a connecting area with the extension plane plate; and the bush forms a first protrusion element and a second protrusion element respectively extending out of its two ends; the first and the second protrusion elements respectively have a first and a second end face;

a supporting member which is fixedly connected in the screen and is connected with the extension plane plate of the spring tube; and two torsion sleeves tightly slipping over the shaft, they are respectively provided adjacent to the two ends of the bush, and each torsion sleeve has an axial cut and has two contact elements extending respectively toward the two ends of the bush; the contact elements respectively interfere with the first and the second protrusion elements and also both have a first and a second end face; wherein:

before the foldable screen of the electric equipment is rotated from its closed position to a vertical angular position relative to the main body of a keyboard, only the bush is rotated relative to the shaft, so that the torsion force for the pivot hinge can be smaller; after that, the first end faces of both the first and the second protrusion elements of the bush contact the first end faces of both the contact elements of the two torsion sleeves respectively, in order that the bush and the two torsion sleeves rotate relative to the shaft simultaneously, so that the torsion force for the pivot hinge is increased, thus the screen and the main body of the keyboard are rotated to the maximum opening angular position;

before the screen is rotated from its maximum opening angular position to the vertical angular position relative to the main body of a keyboard, the first end faces of both the first and the second protrusion elements of the bush are separated from the first end faces of both the contact elements of the two torsion sleeves respectively, only the bush is rotated relative to the shaft, so that the torsion force for the pivot hinge can be smaller; after that, the second end faces of both the first and the second protrusion elements of the bush contact the second end faces of both the contact elements of the two torsion sleeves respectively, in order that the bush and the two torsion sleeves rotate relative to the shaft simultaneously, so that the torsion force for the pivot hinge is increased, thus the screen and the main body of the keyboard are rotated to the closed position.

Further, the axle of the two-stage type torsion pivot hinge of the present invention has a sector element at a connecting area of the connecting section with its shaft; the torsion sleeve adjacent to this sector element has an arcuate element being on one side and extending out of it in opposition to the side with a corresponding one of the contact elements; when the screen and the main body of the keyboard are rotated to the maximum opening angular position, the arcuate element and the sector element provide a stop function. Meantime, the middle position of the bush axially forms a cut slit and has an abutting segment; a protrusion protrudes out of the surface of the shaft and extends into the cut slit; when the screen and the main body of the keyboard are rotated to the maximum opening angular position, the protrusion abuts against the abutting segment. Thereby two kinds of functions of limiting the maximum opening angular degree can be obtained.

The present invention will be apparent in its structure and its effect of use after reading the detailed description of the preferred embodiment thereof in reference to the accompanying drawings.

DETAILED DESCRIPTION OF THE PREFERRED EMBODIMENT

Figure 1:
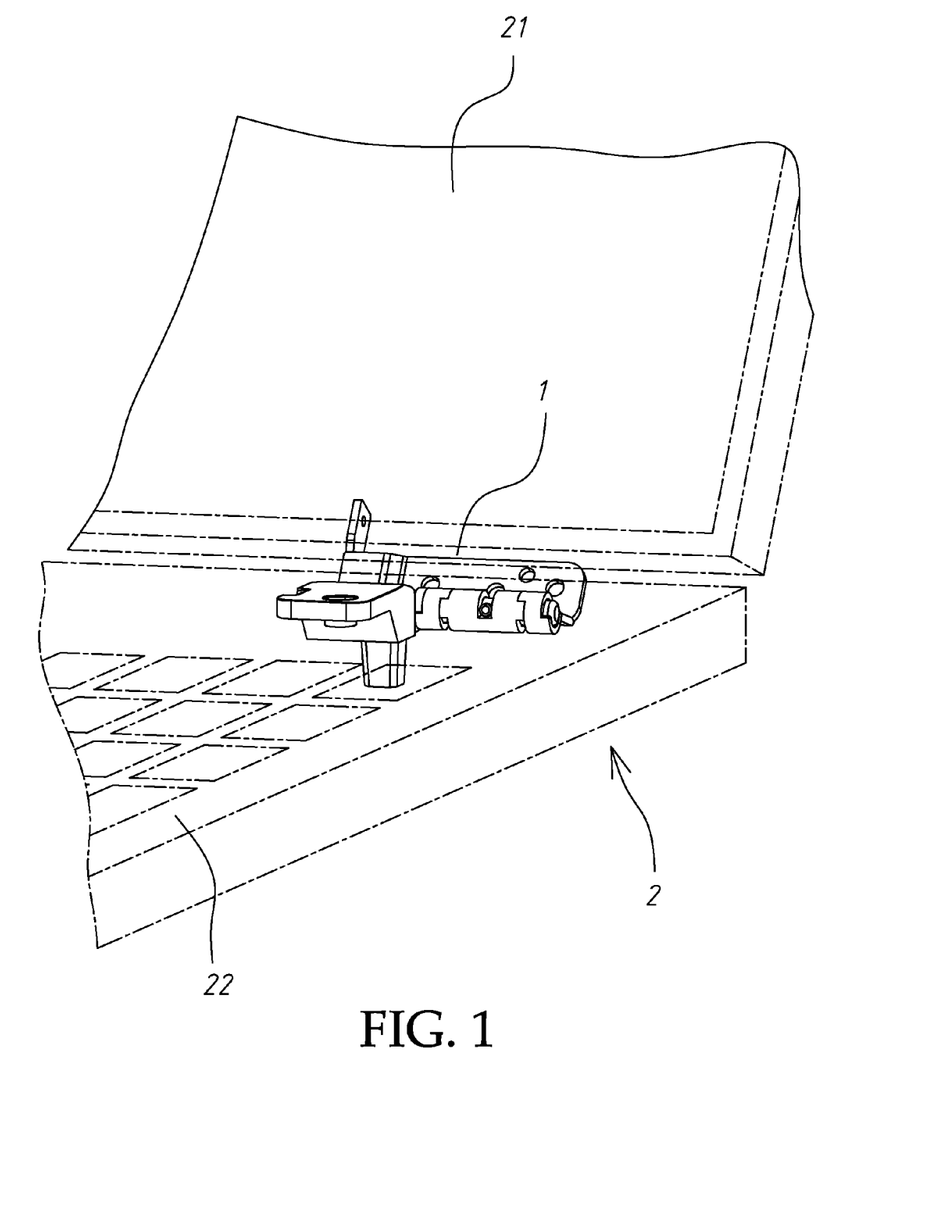
FIG. 1 is a schematic perspective view showing the present invention being mounted on a set of foldable electric equipment.

Referring to FIG. 1, a two-stage type torsion pivot hinge 1 of the present invention is mounted on a set of foldable electronic equipment 2 including a screen 21 and a main body 22 of a keyboard, in order that the pivot hinge 1 can provide an increased rotational torsion force after the screen 21 is rotated over an approximately vertical angular position relative to the main body 22 of the keyboard, and in order that the screen 21 can be operated conveniently by touch controlling; however, when the screen 21 is moved to close from its maximum opening angular position (e.g. 135 degrees) toward the main body 22 of the keyboard and over an approximately vertical angular position, the pivot hinge 1 can also provide an increased rotational torsion force. By having different torsion forces, a design of two-stage torsion force action is obtained.

Figure 2:
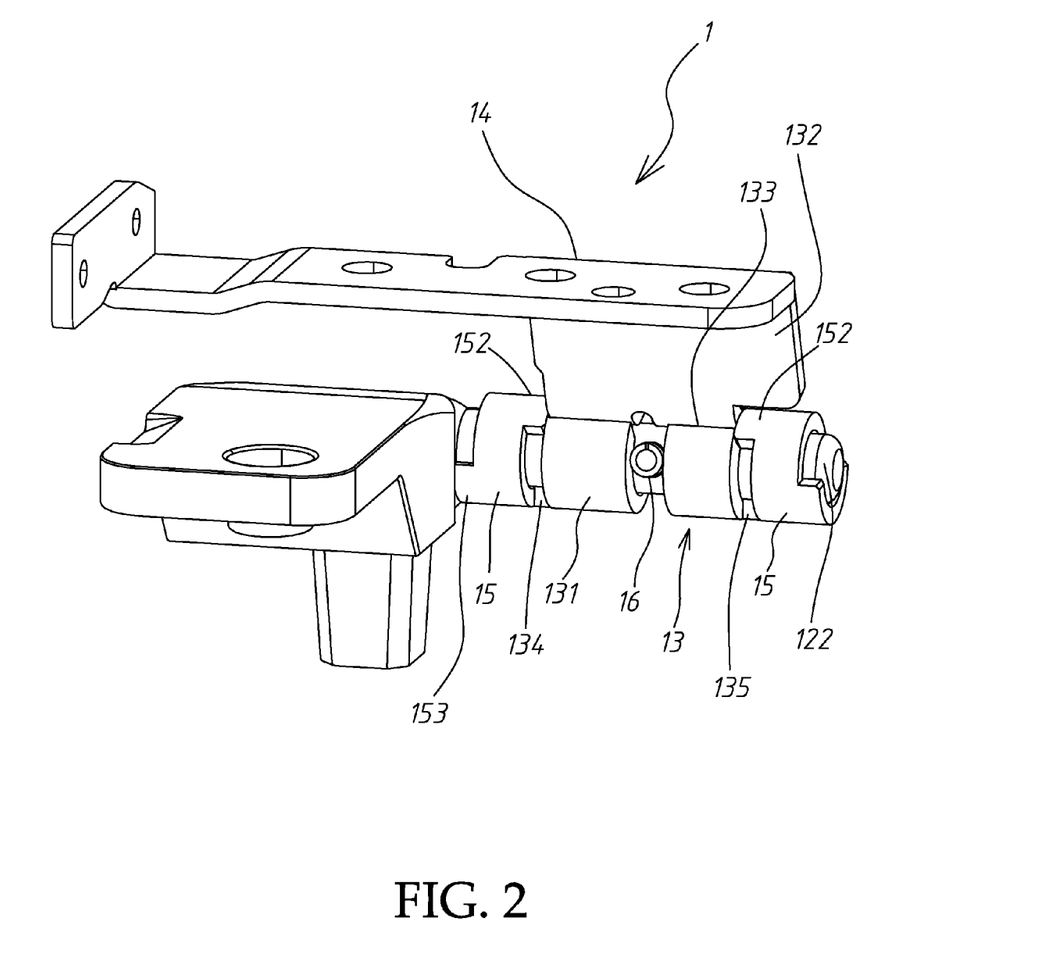
FIG. 2 is a perspective view of a first embodiment of the present invention after assembling.
Figure 3:
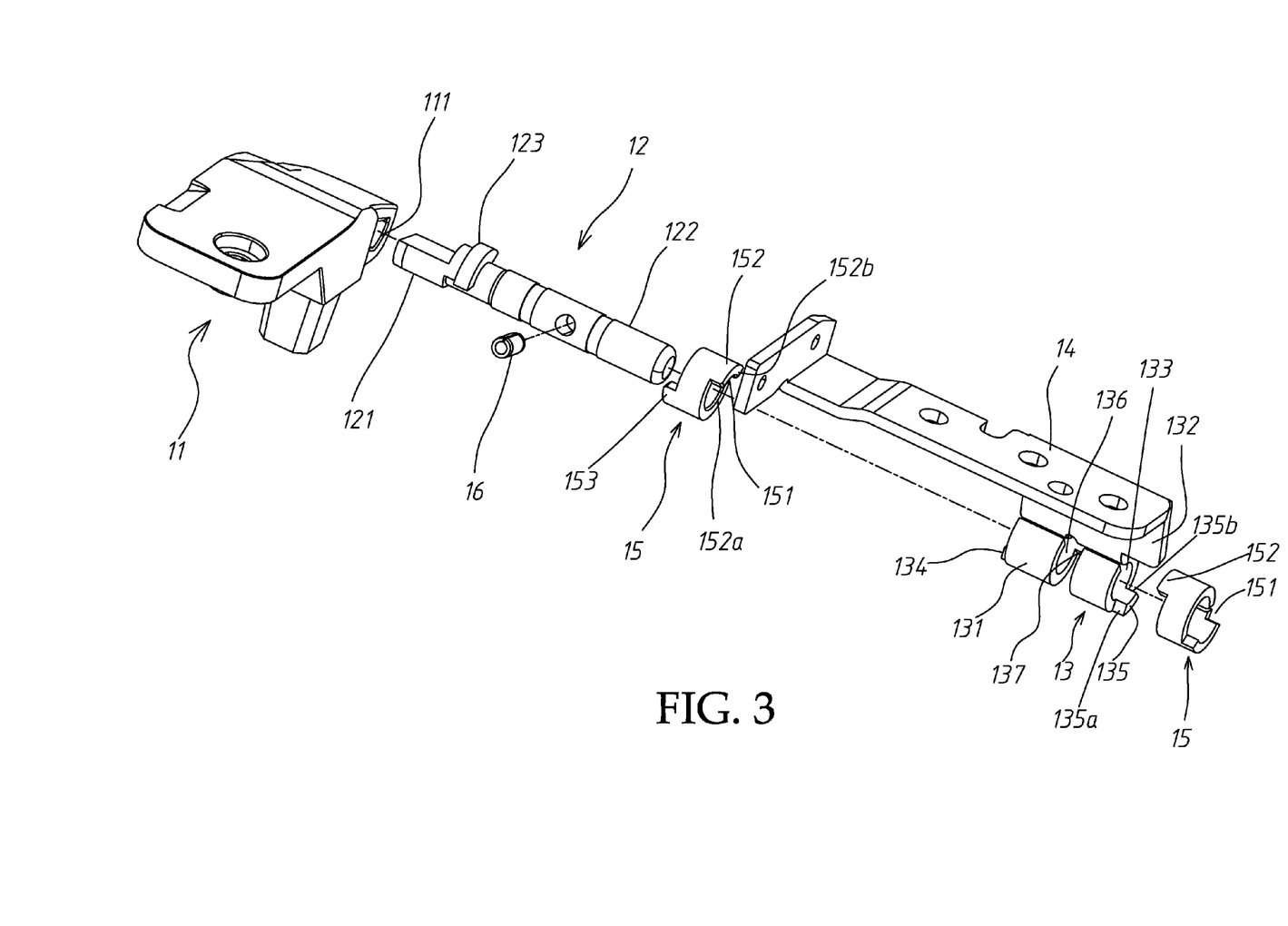
FIG. 3 is an anatomic perspective view of the first embodiment of the present invention.

Referring to FIGS. 2 and 3 depicting the first embodiment of the present invention, the two-stage type torsion pivot hinge 1 mainly comprises a base 11, an axle 12, a spring tube 13, a supporting member 14, two torsion sleeves 15 and a protrusion 16.

The base 11 is fixed in the main body 22 of the keyboard; and is connected with a connecting section 121 of an axle 12 by means of a non-circular hole 111; the axle 12 has a shaft 122 and has a sector element 123 at a connecting area of the connecting section 121 with its shaft 122.

The spring tube 13 has a bush 131 tightly slipping over the shaft 122 and has an extension plane plate 132; the bush 131 forms an axial cut 133 at a connecting area with the extension plane plate 132; and the bush 131 forms a first protrusion element 134 and a second protrusion element 135 extending out of its two ends respectively; the first and the second protrusion elements 134, 135 respectively have a first and a second end face 135a, 135b (the first protrusion element 134 and the second protrusion element 135 look same, the second protrusion element 135 also has a first and a second end face). The supporting member 14 is fixedly connected in the screen 21 and is connected with the extension plane plate 132 of the spring tube 13.

The two torsion sleeves 15 are tightly slipped over the shaft 122, they are respectively provided adjacent to the two ends of the bush 131, and each torsion sleeve 15 has an axial cut 151 and has two contact elements 152 extending respectively toward the two ends of the bush 131; the contact elements 152 respectively interfere with the first and the second protrusion elements 134,135 and also each has a first and a second end face 152a, 152b.

The torsion sleeve 15 adjacent to the sector element 123 of the axle 12 has an arcuate element 153 extending out on one side of it in opposition to the side with a corresponding one of the contact elements 152. When the screen 21 and the main body 22 of the keyboard are rotated to the maximum opening angular position, the arcuate element 153 and the sector element 123 provide stop function that is a function of limiting the maximum opening angular degree.

The middle position of the bush 131 axially forms a cut slit 136 and has an abutting segment 137; the cut slit 136 extends from the abutting segment 137 to the axial cut 133 of the bush 131. In cooperation with the cut slit 136, a protrusion 16 protrudes out of the surface of the shaft 122 and extends into the cut slit 136. When the screen 21 and the main body 22 of the keyboard are rotated to the maximum opening angular position, the protrusion 16 abuts against the abutting segment 137.

Figure 4:
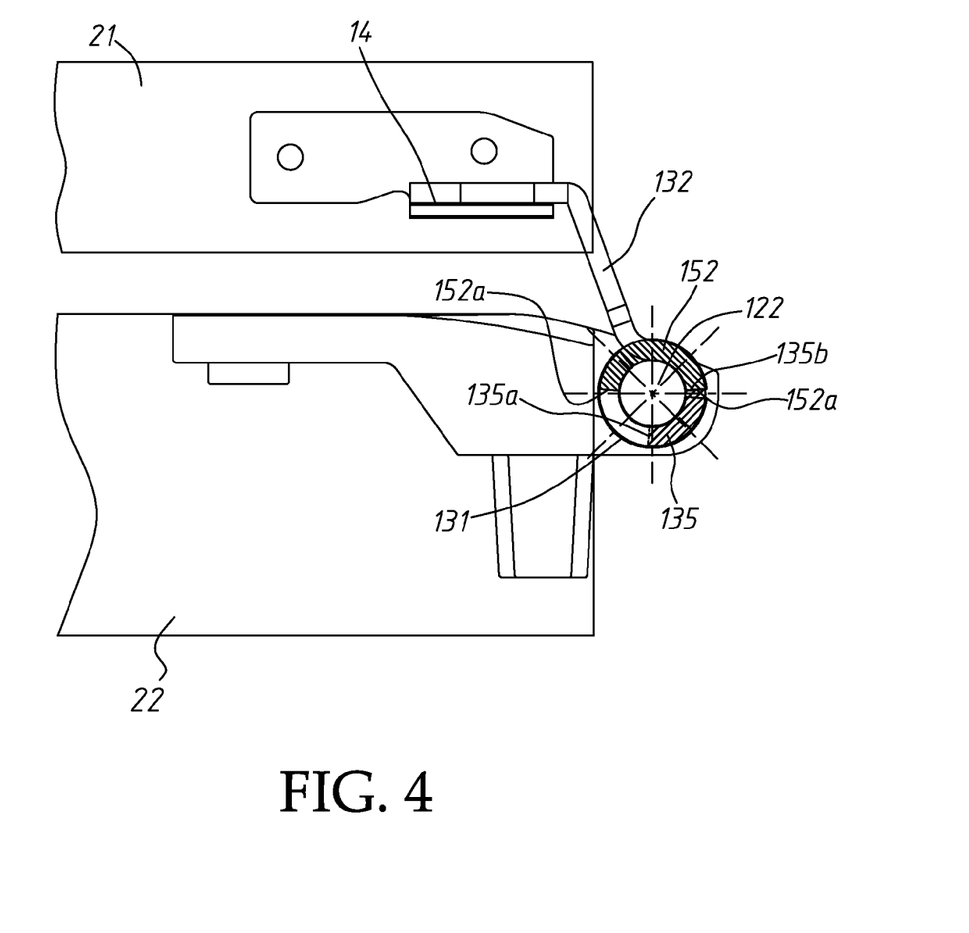
FIGS. 4 to 8 are schematic views showing actions of the first embodiment of the present invention.
Figure 7:
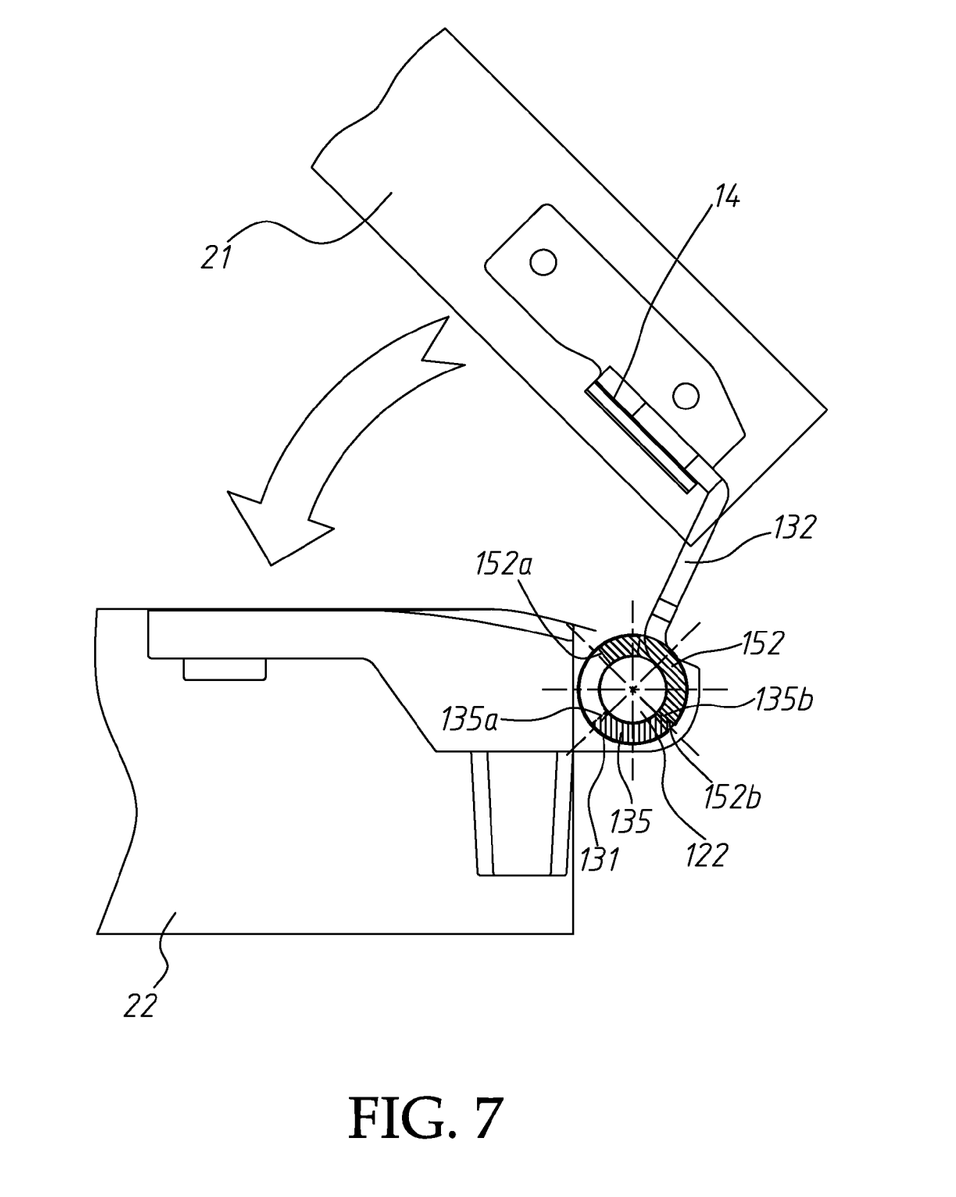
Figure 8:
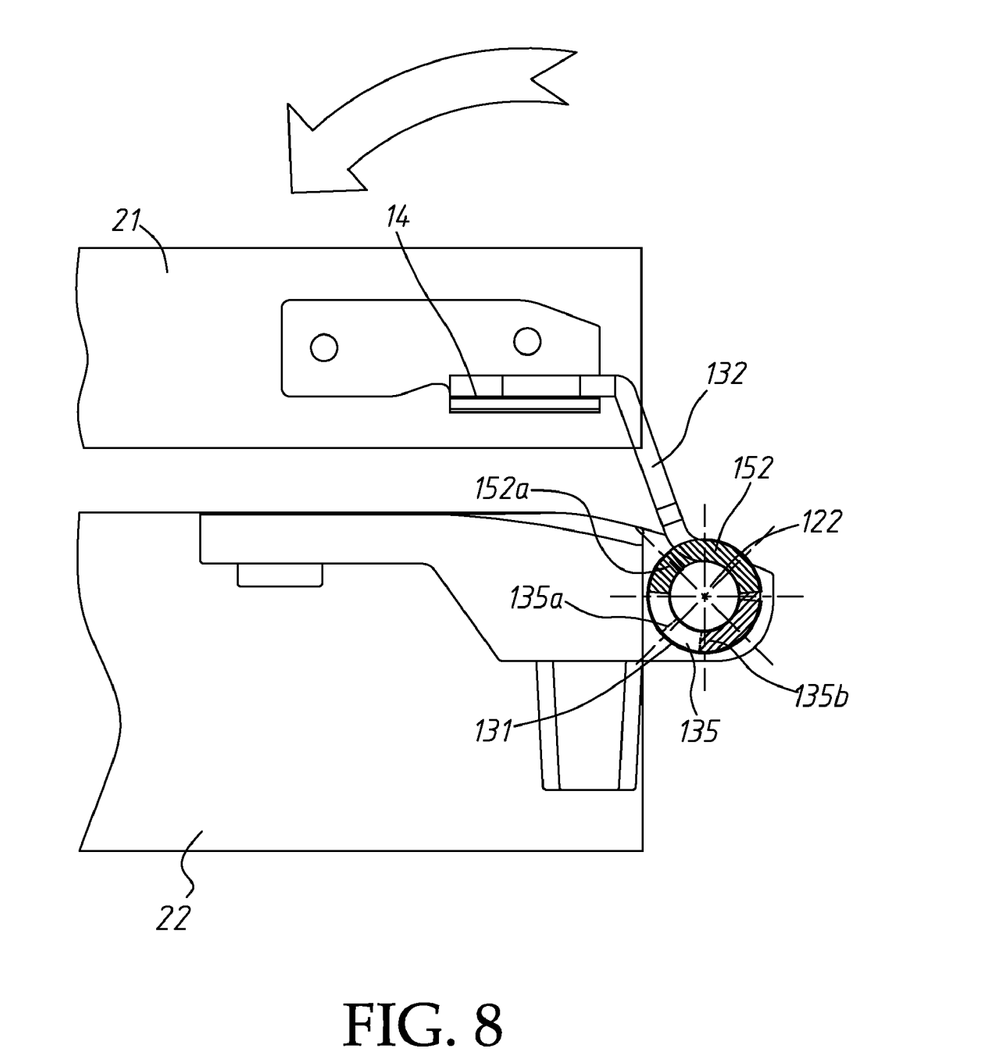
Figure 9:
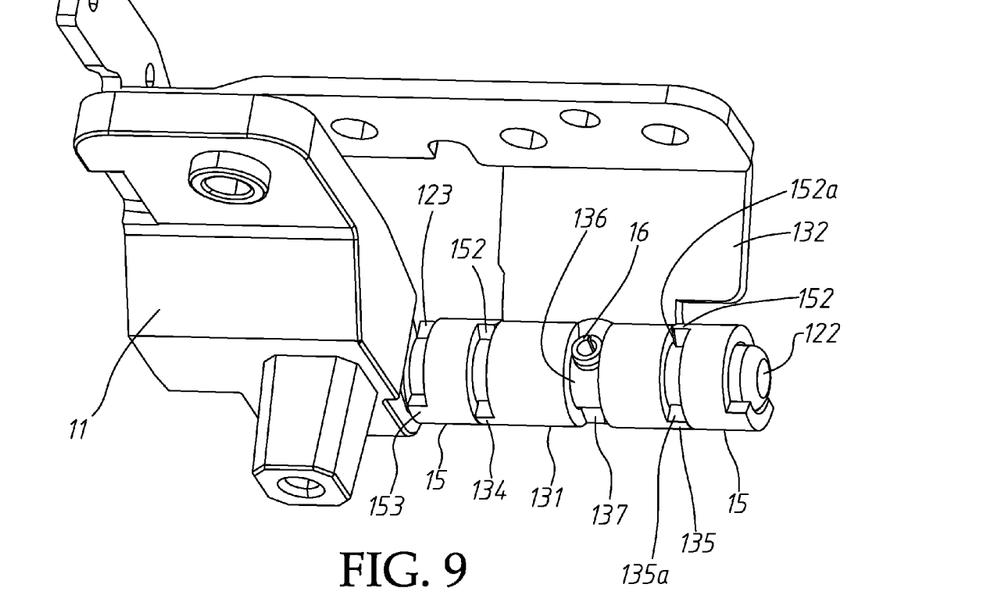
FIG. 9 is a perspective view showing the first embodiment which is closed of the present invention from another viewing angular position.

Referring to FIGS. 4 to 8 showing actions of the first embodiment of the two-stage type torsion pivot hinge 1 of the present invention, in FIG. 4, the screen 21 of the foldable electronic equipment 2 is closed up to the main body 22 of the keyboard; at this time, as shown in FIG. 9, in the two-stage type torsion pivot hinge 1, the first end faces 135a of the first and the second protrusion elements 134, 135 and the first end faces 152a of the contact elements 152 are not in contact with each other. Before the screen 21 is rotated from the closed position to a vertical angular position relative to the main body 22 of the keyboard, only the bush 131 is rotated relative to the shaft 122, so that the torsion force for the pivot hinge 1 can be smaller.

Figure 5:
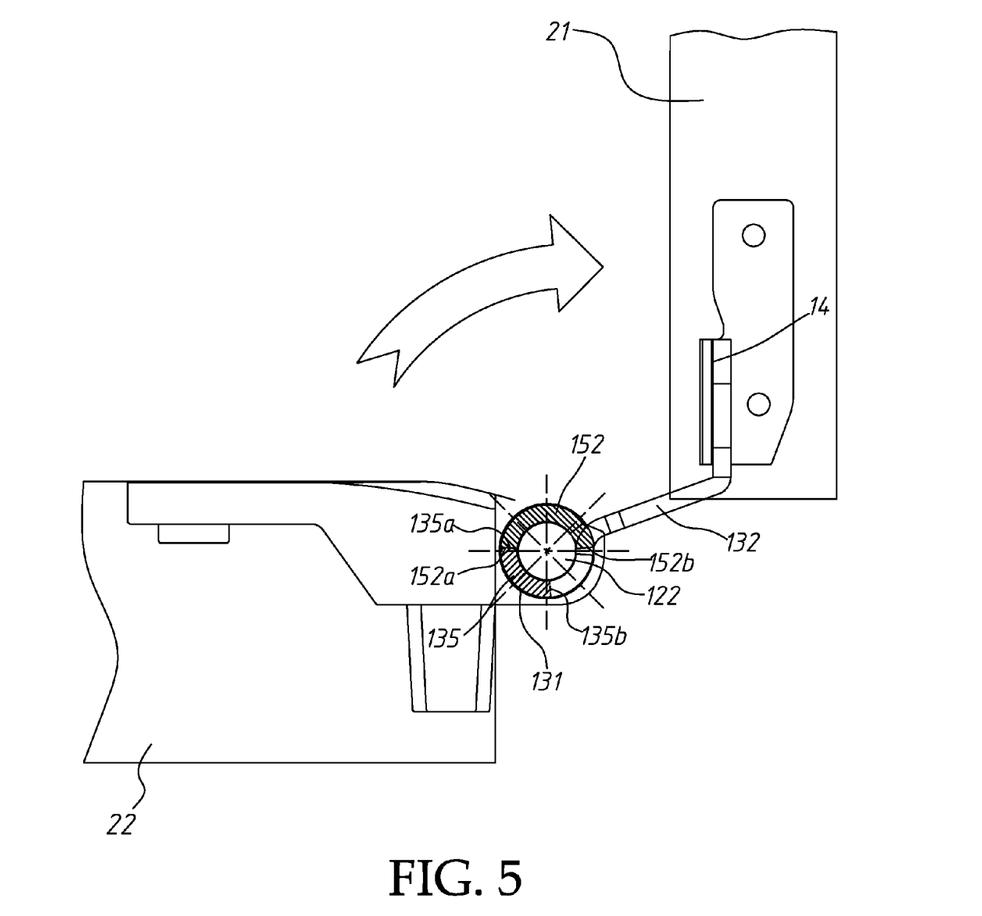
Figure 6:
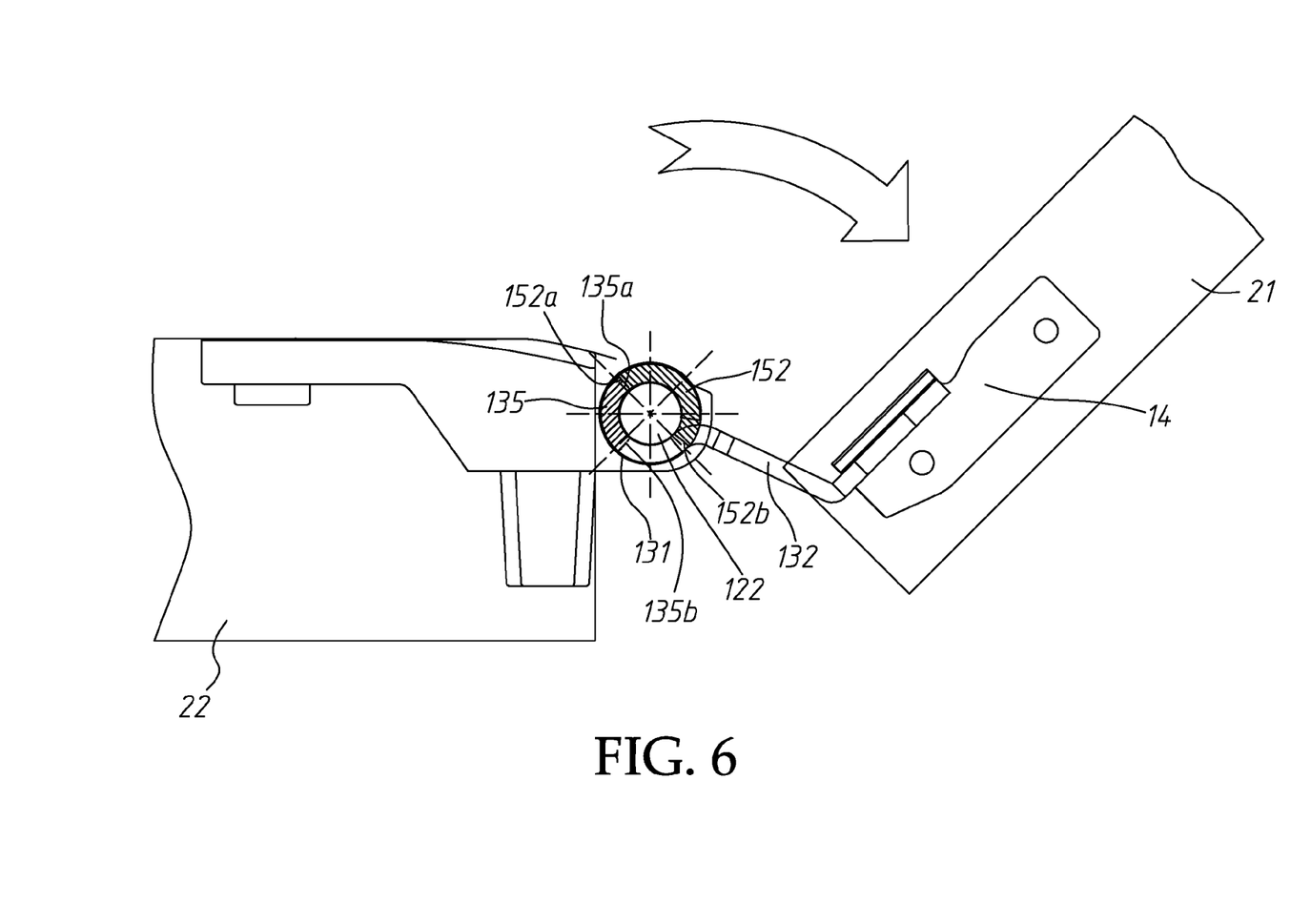
Figure 10:
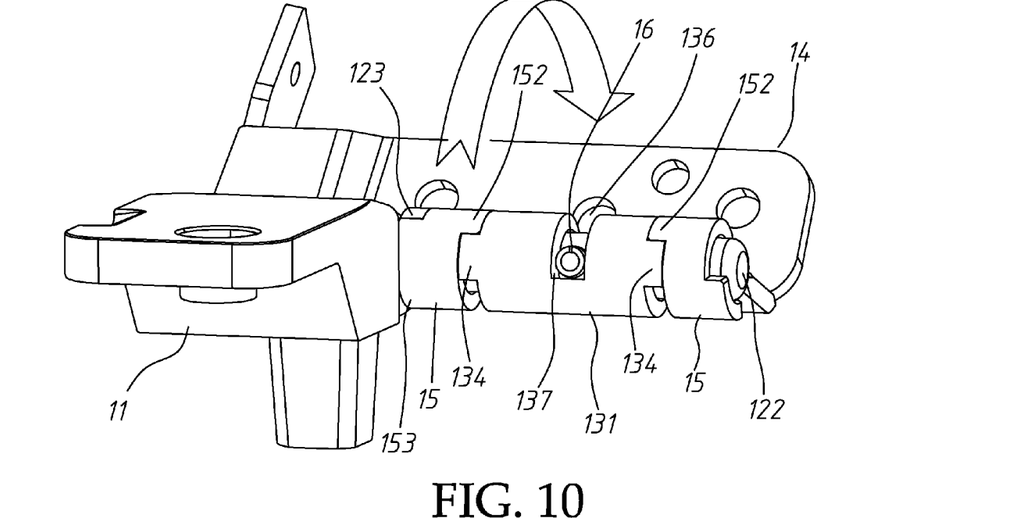
FIG. 10 is a perspective view showing the first embodiment of the present invention from another viewing angular position when being rotated to the maximum opening angular position.

As shown in FIG. 5, after the screen 21 is rotated from the closed position to a vertical angular position relative to the main body 22 of a keyboard, the first end faces 135a of the first and the second protrusion elements 134, 135 of the bush 131 are contacted with the two torsion sleeves 15, hence the bush 131 and the two torsion sleeves 15 are rotated simultaneously relative to the shaft 122, so that the torsion force for the pivot hinge 1 is increase until the screen 21 and the main body 22 of the keyboard are rotated to the maximum opening angular position (e.g. 135 degrees). As shown in FIGS. 6 and 10, at this time, the arcuate element 153 and the sector element 123 provide stop function, and the protrusion 16 abuts against the abutting segment 137.

Figure 11:
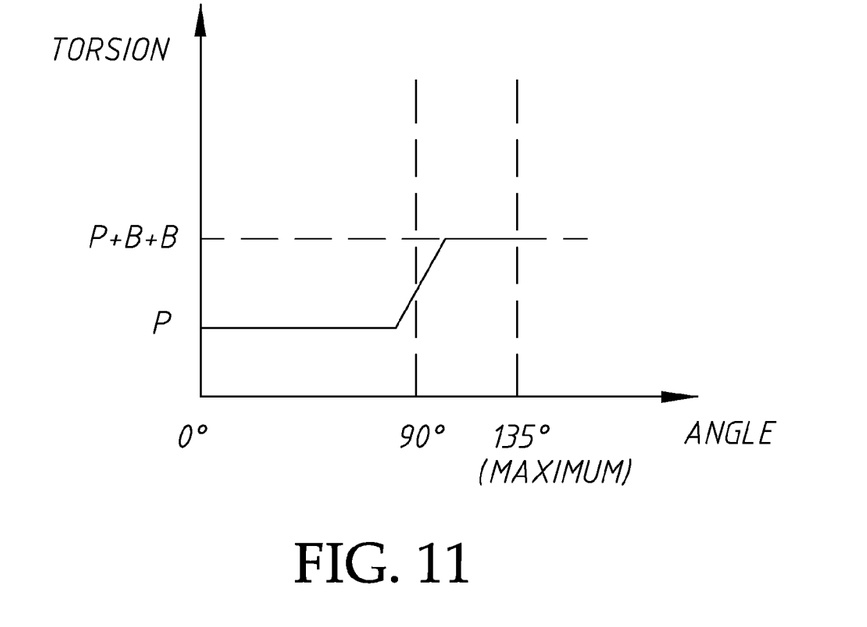
FIG. 11 is a diagram showing change of the opening torsion force on the first embodiment of the present invention.

FIG. 11 represents the change of the torsion force in opening the screen 21 of the foldable electronic equipment 2 relatively to the main body 22 of the keyboard. Wherein P means the torsion force provided by the bush 131, B means the torsion force provided by a torsion sleeve 15; thereby after being opened to the vertical angular position, a stronger supporting force is provided for the convenience of operation of the touch screen 21.

Similarly, before the screen 21 is rotated from the maximum opening angular position (as shown in FIG. 6) to a vertical angular position relative to the main body 22 of a keyboard, the first end faces 135a of the first and the second protrusion elements 134, 135 of the bush 131 are separated from the first end faces 152a of the contact elements 152 of the two torsion sleeves 15 respectively, only the bush 15 is rotated relative to the shaft 122, so that the torsion force for the pivot hinge 1 can be smaller.

The screen 21 and the main body 22 of the keyboard are rotated to about the vertical angular position (as shown in FIG. 7), the first end faces 135a of the first and the second protrusion elements 134, 135 of the bush 131 are contacted with the second end faces 152b of the contact elements 152 of the two torsion sleeves 15 respectively, hence the bush 131 and the two torsion sleeves 15 are rotated simultaneously relative to the shaft 122, so that the torsion force for the pivot hinge 1 is increase until the screen 21 is rotated to its closed position, such as is shown in FIG. 8 in the same state as in FIG. 4.

Figure 12:
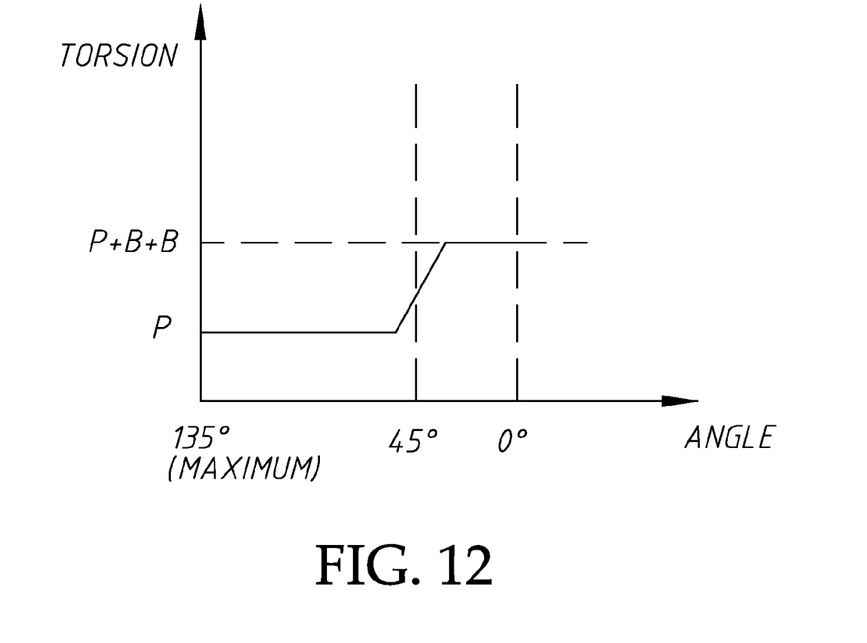
FIG. 12 is a diagram showing change of the closing torsion force on the first embodiment of the present invention.

As compared to FIG. 11, FIG. 12 represents the change of the torsion force in closing the screen 21 of the foldable electronic equipment 2 relatively to the main body 22 of the keyboard. Wherein P means the torsion force provided by the bush 131, B means the torsion force provided by a torsion sleeve 15; thereby after being closed to the vertical angular position, an increased supporting force P+B+B is obtained by simultaneous action of the bush 131 and the torsion sleeve 15. With this design, the exerting force needed to rotate the screen 21 to the vertical angular position is smaller, but before it is to be closed, a stronger force is provided to prevent impact ob the screen 21 on the main body 22 of the keyboard.

Figure 13:
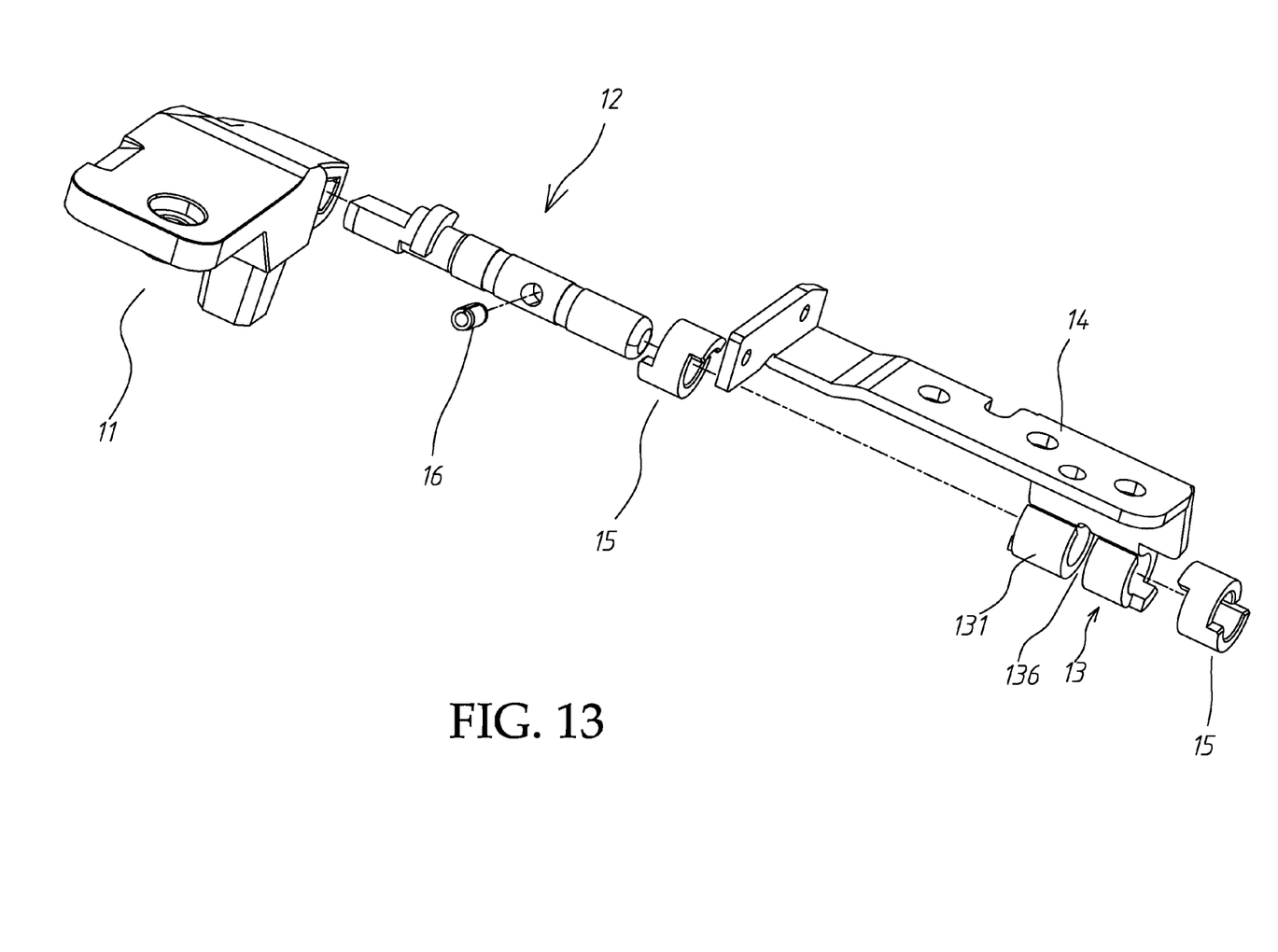
FIG. 13 is an anatomic perspective view of the second embodiment of the present invention.
Figure 14:
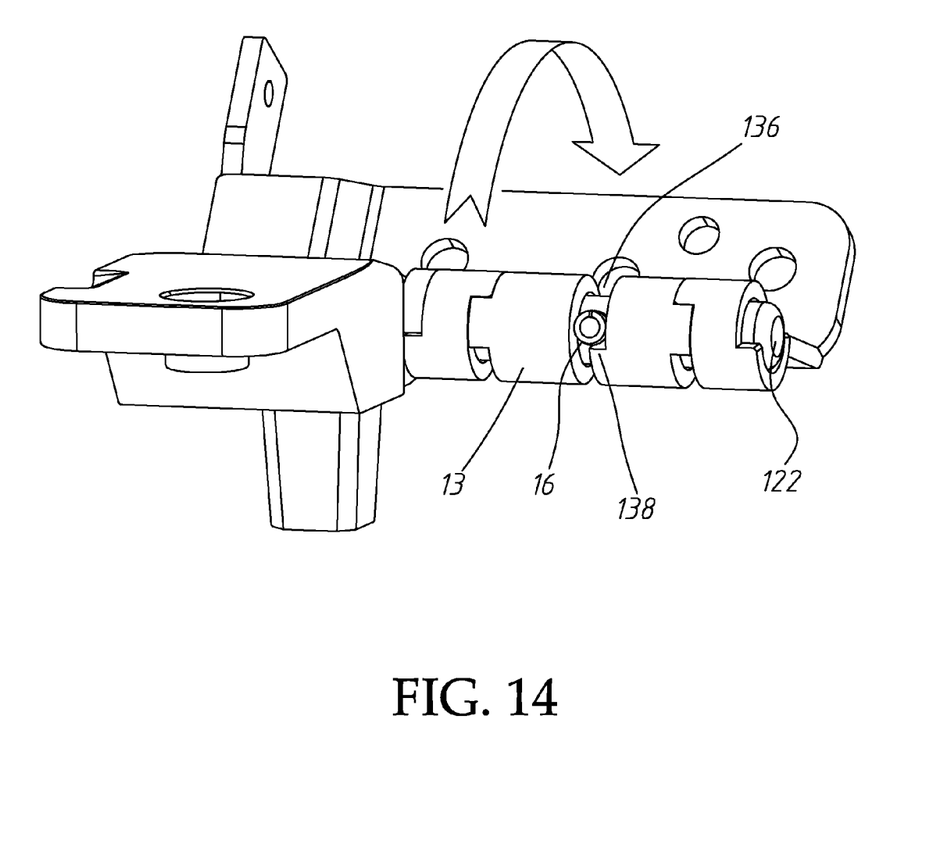
FIG. 14 is a perspective view showing the second embodiment of the present invention from another viewing angular position when being rotated to the maximum opening angular position.

Referring to FIG. 13 showing the second embodiment of the present invention, the drawing is generally same as FIG. 3, except that the cut slit 136 formed at the middle position of the bush 131 separates the bush 131 into two segments. Referring to FIG. 14 (which is similar to FIG. 10), an inner side of one segment of the separated bush 131 is formed a protruding stop sheet 138 which is abutted on by the protrusion 16 when the screen 21 and the main body 22 of the keyboard are rotated to the maximum opening angular position.

Figure 15:
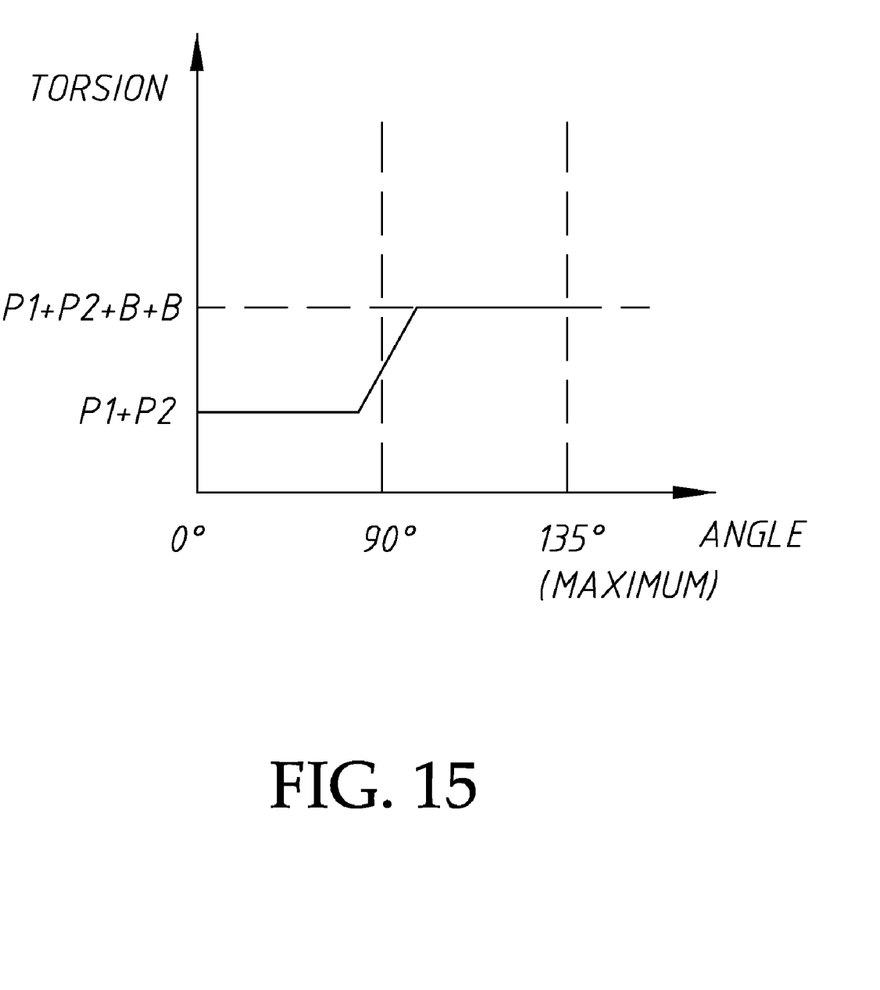
FIG. 15 is a diagram showing change of the opening torsion force on the second embodiment of the present invention.

By separating the bush 131 into two segments in the second embodiment of the present invention, two different torsion forces P1 and P2 can be provided respectively, therefore, after the screen 21 and the main body 22 of the keyboard of the foldable electronic equipment 2 are opened to their working positions, they can get larger supporting forces, and can get larger stopping forces before being totally closed to prevent impact.

The present invention surely can get the expected object thereof to provide an improved structure with its effects. Therefore, what I claim as new and desire to be secured by Letters Patent of the United States is.

We claim:

1. A two-stage torsion pivot hinge mounted on a set of foldable electronic equipment including a screen and a main body of a keyboard, and comprising:

a base which is fixed in said main body of said keyboard;
an axle which has a connecting section in connecting with said base, and has a shaft;
a spring tube having a bush tightly slipping over said shaft and having an extension plane plate; said bush forms an axial cut at a connecting area with said extension plane plate; and said bush forms a first protrusion element and a second protrusion element respectively extending out of its two ends; said first and said second protrusion elements respectively have a first and a second end face;
a supporting member which is fixedly connected in said screen and is connected with said extension plane plate of said spring tube; and
two torsion sleeves tightly slipping over said shaft, being respectively provided adjacent to said two ends of said bush, and each of said torsion sleeves has an axial cut and has two contact elements extending respectively toward said two ends of said bush; said contact elements respectively interfere with said first and said second protrusion elements and also both have a first and a second end face;

wherein:

before said foldable screen of said electric equipment is rotated from its closed position to a vertical angular position relative to said main body of said keyboard, only said bush is rotated relative to said shaft, so that torsion force for said pivot hinge is smaller; after that, said first end faces of both said first and said second protrusion elements of said bush contact said first end faces of both said contact elements of said two torsion sleeves respectively, in order that said bush and said two torsion sleeves rotate relative to said shaft simultaneously, so that torsion force for said pivot hinge is increased, thus said screen and said main body of said keyboard are rotated to a maximum opening angular position;

before said screen is rotated from said maximum opening angular position to said vertical angular position relative to said main body of said keyboard, said first end faces of both said first and said second protrusion elements of said bush are separated from said first end faces of both said contact elements of said two torsion sleeves respectively, only said bush is rotated relative to said shaft, so that torsion force for said pivot hinge is smaller; after that, said second end faces of both said first and the second protrusion elements of said bush contact said second end faces of both said contact elements of said two torsion sleeves respectively, in order that said bush and said two torsion sleeves rotate relative to said shaft simultaneously, so that torsion force for said pivot hinge is increased, thus said screen and said main body of said keyboard are rotated to a closed position.

2. The two-stage torsion pivot hinge as claimed in claim 1, wherein said axle has a sector element at a connecting area of said connecting section with said shaft, said torsion sleeve adjacent to said sector element has an arcuate element being on one side and extending out of it in opposition to another side with a corresponding one of said contact elements; when said screen and said main body of said keyboard are rotated to said maximum opening angular position, said arcuate element and said sector element provide stop function.

3. The two-stage torsion pivot hinge as claimed in claim 2, wherein a middle position of said bush axially forms a cut slit and has an abutting segment; a protrusion protrudes out of a surface of said shaft and extends into said cut slit; when said screen and said main body of said keyboard are rotated to said maximum opening angular position, said protrusion stops said abutting segment.

4. The two-stage torsion pivot hinge as claimed in claim 3, wherein said cut slit of said bush extends from said abutting segment to said axial cut of said bush.

5. A two-stage torsion pivot hinge mounted on a set of foldable electronic equipment including a screen and a main body of a keyboard, and comprising:
   a base which is fixed in said main body of said keyboard;
   an axle which has a connecting section in connecting with said base, and a shaft;
   a spring tube having a bush tightly slipping over said shaft and having an extension plane plate; said bush forms an axial cut at a connecting area with said extension plane plate; said bush has a cut slit formed at a middle position of said bush that separates said bush into two sections; and said bush forms a first protrusion element and a second protrusion element respectively extending out of its two ends; said first and said second protrusion elements respectively have a first and a second end face;
   a supporting member which is fixedly connected in said screen and is connected with said extension plane plate of said spring tube; and
   two torsion sleeves tightly slipping over said shaft, being respectively provided adjacent to said two ends of said bush, and each of said torsion sleeve has an axial cut and has two contact elements extending respectively toward said two ends of said bush; said contact elements respectively interfere with said first and said second protrusion elements and also both have a first and a second end face;
   wherein:
   before said foldable screen of said electric equipment is rotated from its closed position to a vertical angular position relative to said main body of said keyboard, only said bush is rotated relative to said shaft, so that torsion force for said pivot hinge is smaller; after that, said first end faces of both said first and said second protrusion elements of said bush contact said first end faces of both said contact elements of said two torsion sleeves respectively, in order that said bush and said two torsion sleeves rotate relative to said shaft simultaneously, so that torsion force for said pivot hinge is increased, thus said screen and said main body of said keyboard are rotated to a maximum opening angular position;
   before said screen is rotated from said maximum opening angular position to said vertical angular position relative to said main body of said keyboard, said first end faces of both said first and said second protrusion elements of said bush are separated from said first end faces of both said contact elements of said two torsion sleeves respectively, only said bush is rotated relative to said shaft, so that torsion force for said pivot hinge is smaller; after that, said second end faces of both said first and the second protrusion elements of said bush contact said second end faces of both said contact elements of said two torsion sleeves respectively, in order that said bush and said two torsion sleeves rotate relative to said shaft simultaneously, so that torsion force for said pivot hinge is increased, thus said screen and said main body of said keyboard are rotated to a closed position.

6. The two-stage torsion pivot hinge as claimed in claim 5, wherein said axle has a sector element at a connecting area of said connecting section with said shaft, said torsion sleeve adjacent to said sector element has an arcuate element being on one side and extending out of it in opposition to another side with a corresponding one of said contact elements; when said screen and said main body of said keyboard are rotated to said maximum opening angular position, said arcuate element and said sector element provide stop function.

* * * * *